235-379 SR

4/16/85 OR 4,511,795

United States Patent [19]

Wood et al.

[11] Patent Number: 4,511,795

[45] Date of Patent: Apr. 16, 1985

[54] CASH DISPENSING APPARATUS

[75] Inventors: John Wood; Raymond J. Dominey, both of Hampshire, England

[73] Assignee: De La Rue Systems Limited, London, England

[21] Appl. No.: 448,890

[22] PCT Filed: Mar. 22, 1982

[86] PCT No.: PCT/GB82/00091

§ 371 Date: Nov. 19, 1982

§ 102(e) Date: Nov. 19, 1982

[87] PCT Pub. No.: WO82/03287

PCT Pub. Date: Sep. 30, 1982

[30] Foreign Application Priority Data

Mar. 20, 1981 [GB] United Kingdom ................ 8108828

[51] Int. Cl.[3] ............................................ G06K 15/30

[52] U.S. Cl. .................................... 235/379; 235/375

[58] Field of Search ............................... 235/379, 375; 194/DIG. 26

[56] References Cited

U.S. PATENT DOCUMENTS 4,114,884 9/1978 Jones ............................. 235/379 X

*Primary Examiner*—Harold I. Pitts

*Attorney, Agent, or Firm*—Sughrue, Mion, Zinn, Macpeak and Seas

[57] ABSTRACT

Cash dispensing apparatus comprising: at least one feed module (2) for storing banknotes and for delivering a selected sequence of banknotes. Two stacking platforms (A,B), each platform having a dumping facility (11, 11') to dump a stack of banknotes supported on the platform; at least two dispensing stations (not shown) associated with each platform; a transfer means (13, 13') for each platform to transfer banknotes stacked on the platform to a selected one of the dispensing stations.

7 Claims, 4 Drawing Figures

CASH DISPENSING APPARATUS

BACKGROUND OF THE INVENTION

This invention relates to cash dispensing apparatus and more particularly to an apparatus for dispensing a sum of money to one of a plurality of dispensing stations accessible to bank clerks and/or customers.

With the introduction of micro-processor control of cash dispensing apparatus, it is now possible to programme the software to control multiple dispensing stations and thus utilize the apparatus to its maximum.

An aim of the present invention is to provide a cash dispensing apparatus which dispenses, on command, a requested sum of money to any one of at least four dispensing stations.

According to the invention, the cash dispensing apparatus comprises: at least one feed module for storing banknotes and for delivering a selected sequence of banknotes; at least two stacking platforms, each platform having a dumping facility to dump a stack of banknotes supported on the platform; at least two dispensing stations associated with each platform; a transfer means for each platform to transfer banknotes stacked on the platform to a selected one of the dispensing stations; diverter means , and a common flowline for banknotes leading from the feed modules to the diverter means which diverts them to a selected one of the stacking platforms; detecting means stationed on the common flow-line for detecting the passage of multiple banknotes and for counting single banknotes; and central control means responsive to the detecting means and to commands for a delivery of banknotes to a selected dispensing station; the central control means causing the diverter means to divert single banknotes to the selected platform associated with the selected dispensing station, but to divert multiple banknotes to another platform; causing the dumping facility at that other platform to dump any multiple banknotes; and, if the detecting means indicate an incorrect total count of single banknotes, also causing the dumping facility at the said selected platform to dump the stack of single banknotes, but otherwise causing the transfer means at that selected platform to transfer the stack to the selected dispensing station.

SUMMARY OF THE INVENTION

In a preferred embodiment, the cash dispensing apparatus consists of two stacking platforms each of which has two dispensing stations, and the diverter means is a two-way device positioned in the feed-line between the two stacking platforms, the diverter means preferably comprising a solenoid-operated pivotable device.

Conveniently, each dumping facility comprises a pivotable section of the stacking platform which pivots downwards into a secure storage container positioned below the platform.

Preferably, the transfer means is in the form of a belt driven pusher plate which traverses the length of the platform between two dispensing stations.

BRIEF DESCRIPTION OF THE DRAWINGS

A preferred embodiment of the cas dispensing apparatus, according to the invention, will now be described with reference to the accompanying diagrammatic drawings in which.

DESCRIPTION OF THE PREFERRED EMBODIMENT

Figure 1:
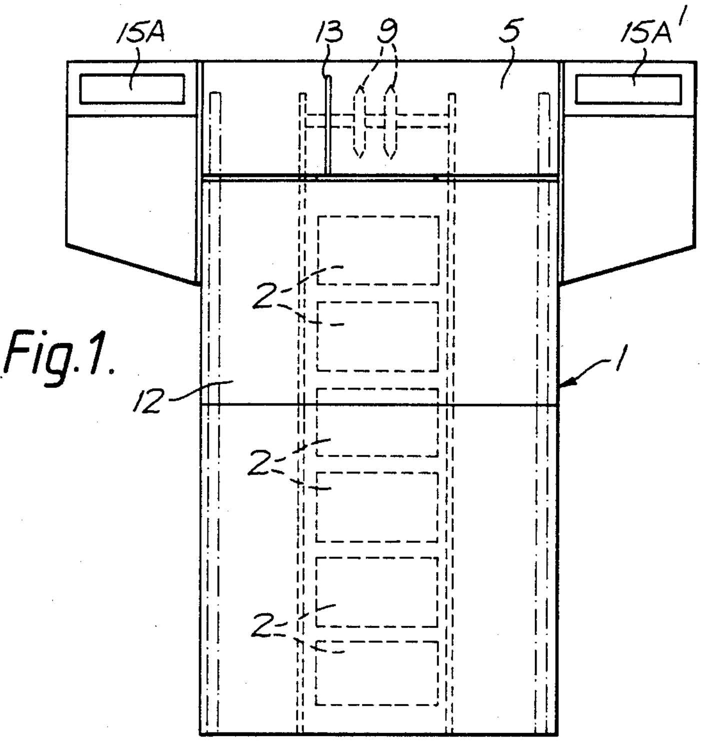
FIG. 1 is an end elevation of a cash dispensing apparatus.
Figure 2:
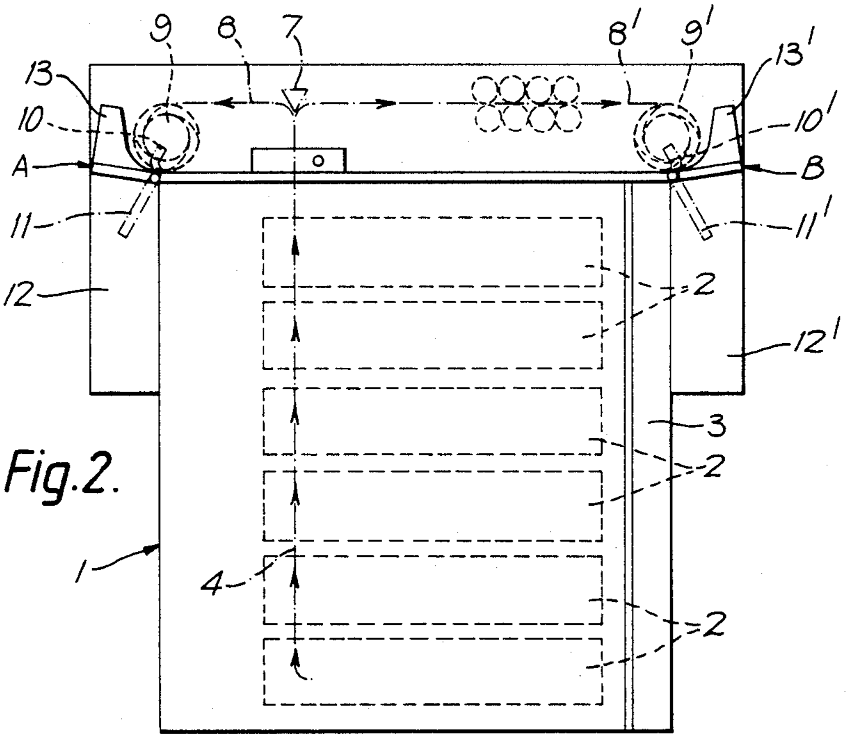
FIG. 2 is a side elevation of the apparatus shown in FIG. 1.
Figure 3:
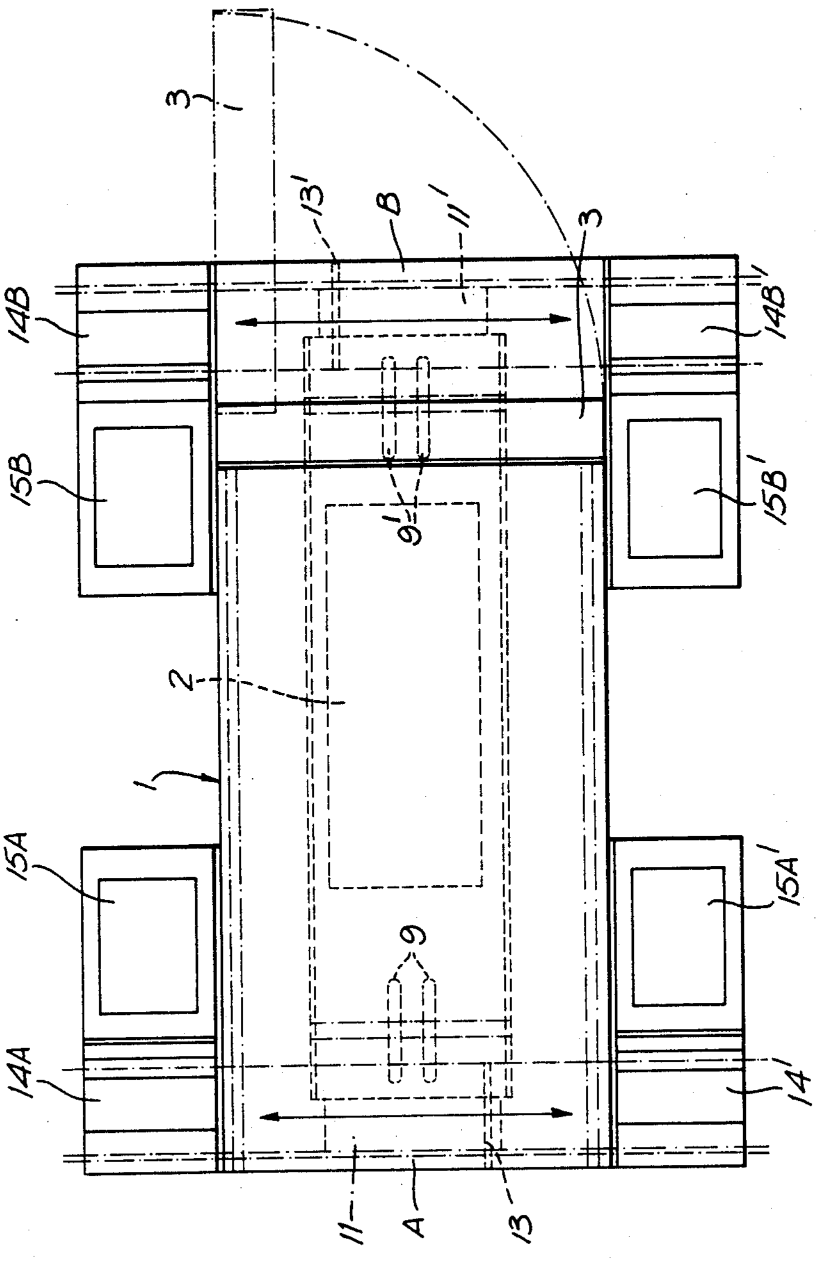
FIG. 3 is a plan of the apparatus shown in FIGS. 1 and 2.

Referring now to the drawings in detail, the cash dispensing apparatus comprises a machine housing 1 for six feed modules. Six cassettes 2 for storing banknotes of different denominations are located one in each feed module and the housing is securely closed by a door 3.

Different mixes of banknotes are fed one by one from the cassettes 2, on command from the operator, along a flow path 4 to a delivery module 5. The flow path 4 passes through a device 6 for detecting multiple notes following which the flow path is divided into two directions by a diverter 7.

At the ends of the divided flow paths 8 and 8', are stacker wheels 9 and 9' which co-operate with stripper plates 10 and 10' to stack a supply of multi-denominational banknotes on respective stacker platforms A and B, one at each end of the dispensing apparatus. Each platform has a dump facility in the form of a pivotable section 11 and 11' to dump the stack of banknotes, when required, into reject compartments 12 and 12' respectively.

The stacking platforms A and B are angled to permit a neat stacking of the banknotes and each platform has a transporting means in the form of a pusher plate 13 and 13' respectively. The construction and operation of the platform and transporting means is described in the Applicant's co-pending application No.PCT/GB81/00219.

When a correct dispense is stacked on, for example, stacking platform A, the pusher plate 13 pushes the stack of banknotes to one of two dispensing stations or customer access points 14A, 14A' for removal by the customer or operator who fed the command into the apparatus via one of the 'key-in' terminals 15A, 15A'.

Figure 4:
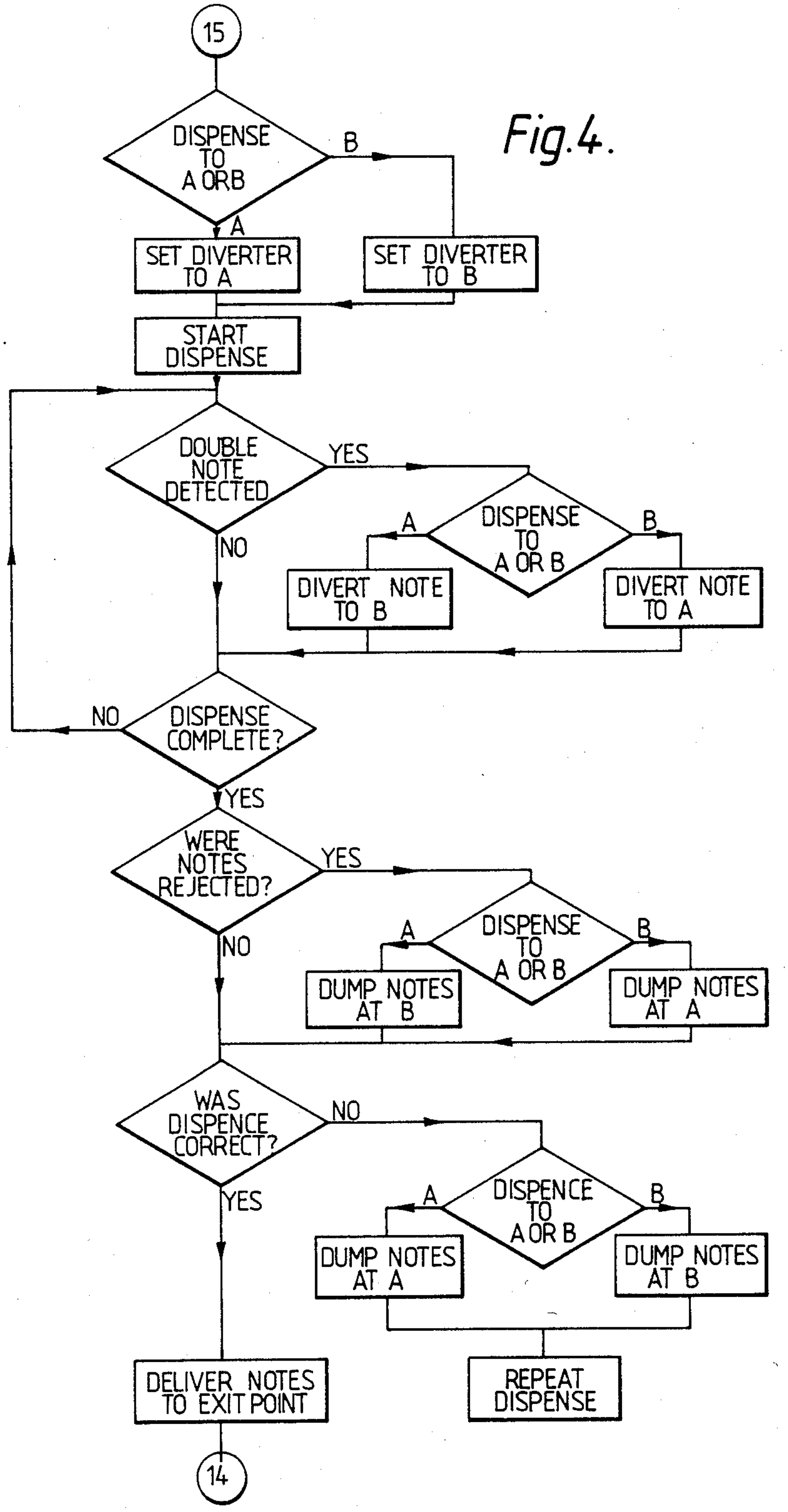
FIG. 4 is an operational flow diagram.

This arrangement thus provides a multi-station banknote dispensing apparatus the overall control of which is effected by means of a programmed microprocessor, the sequence of operation of which is illustrated in the flow diagram of FIG. 4.

Whilst the diagram is generally self-explanatory, the sequence of operation will be more apparent from the following description when read in conjunction with FIG. 4.

A command for a sum of money is fed into one of four key-in terminals 15A, 15A', 15B and 15B' at one of the four dispensing stations 14A, 14A', 14B and 14B' respectively. The requested sum of money is fed from the feed modules along the feed path 4 via the multiple detection device 6. The diverter 7 routes the banknotes along one or other of the paths 8 or 8' where they are stacked by the stacking wheels 9 or 9' on the platforms A or B respectively.

Correctly dispensed banknotes are fed to the selected platform, i.e. the platform at the end of the apparatus from which the command was made. The detector 6 also counts the single notes as they pass it.

If a multiple note, which may be a double note or even a larger nunmber of notes stuck together or overlapping, is detected by the detector 6, it is diverted to the other platform, i.e. the one at the opposite end from that from which the command was received. A further detector (not shown) may cause notes defective in some other way, e.g. worn notes, to be diverted to the other platform. The dispensing operation continues, and acceptable single notes are diverted to the selected platform until all the banknotes that were originally required from the feed modules have been sent to either platform. The microprocessor recognises if at least one of the notes has been rejected, and causes the rejected notes to be dumped from the other platform. It also signals for one or more replacement notes of the correct denomination to be delivered along the same path to the selected platform. If then the total count of single notes, as detected by the detector 6, is correct, the stack is delivered from the platform to the selected dispensing station, i.e. the one from which the command was received.

If, however, for some reason the count is not correct, whether a multiple note had been detected or not, the microprocessor causes the stack of notes on the selected platform to be dumped as well. The dispense is then repeated. If a dispense is dumped, then a command from another terminal can be processed before the original aborted dispense command is repeated.

It is thus possible to utilize the apparatus to its maximum, using a central microprocessor to control all the operations. An average dispense cycle using this apparatus takes approximately two seconds; it would be longer if the selected platform dumped every time a multiple note was detected.

We claim:

1. Cash dispensing apparatus comprising: at least one feed module (2) for storing banknotes and for delivering a selected sequence of banknotes; at least two stacking platforms (A, B), each platform having a dumping facility (11, 11') to dump a stack of banknotes supported on the platform; at least two dispensing stations (14A, 14A'; 14B, 14B') associated with each platform; a transfer means (13, 13') for each platform to transfer banknotes stacked on the platform to a selected one of the dispensing stations; diverter means (7), and a common flow-line (4) for banknotes leading from the feed modules (2) to the diverter means (7) which diverts them to a selected one (for example A) of the stacking platforms; detecting means (6) stationed on the common flow-line (4) for detecting the passage of multiple banknotes and for counting single banknotes; and central control means responsive to the detecting means (6) and to commands for a delivery of banknotes to a selected dispensing station (14A or 14A'); the central control means causing the diverter means (7) to divert single banknotes to the selected platform (A) associated with the selected dispensing station (14A, 14A'), but to divert multiple banknotes to another platform (B); causing the dumping facility at that other platform (B) to dump any multiple banknotes; and, if the detecting means (6) indicates an incorrect total count of single banknotes, also causing the dumping facility at the said selected platform (A) to dump the stack of single banknotes, but otherwise causing the transfer means (11) at that selected platform (A) to transfer the stack to the selected dispensing station (14A or 14A').

2. Cash dispensing apparatus in accordance with claim 1, consisting of two stacking platforms (A, B) each of which has two dispensing stations (14A, 14A'; 14A, 14B'), and wherein the diverter means (7) is a two-way device positioned in the feed-line between the two stacking platforms.

3. Cash dispensing apparatus in accordance with claim 2, wherein the diverter means (7) comprises a solenoid-operated pivotable device.

4. Cash dispensing apparatus in accordance with claim 1, 2 or 3, wherein the dumping facility (11) comprises a pivotable section of the stacking platform (A) which pivots downwards into a secure storage container positioned below the platform.

5. Cash dispensing apparatus in accordance with claim 1, 2 or 3, wherein the transfer means (13) is in the form of a belt-driven pusher plate which traverses the length of the platform (A) between two dispensing stations.

6. Cash dispensing apparatus in accordance with claim 4, wherein the transfer means (13) is in the form of a belt-driven pusher plate which traverses the length of the platform (A) between two dispensing stations.

7. Cash dispensing apparatus in accordance with claim 1, 2 or 3, comprising an operator terminal (15A, 15A', 15B, 15B') at each dispensing station, which enables an operator to command the central control means to provide a certain combination of banknotes at his dispensing station.

* * * * *